(12) United States Patent
Cui et al.

(10) Patent No.: US 12,160,812 B2
(45) Date of Patent: *Dec. 3, 2024

(54) METHOD AND APPARATUS FOR UE ASSUMPTION FOR CGI READING IN NR

(71) Applicant: APPLE INC., Cupertino, CA (US)

(72) Inventors: Jie Cui, San Jose, CA (US); Yang Tang, San Jose, CA (US); Dawei Zhang, Saratoga, CA (US); Hong He, San Jose, CA (US); Chunhai Yao, Beijing (CN); Chunxuan Ye, San Diego, CA (US); Haitong Sun, Cupertino, CA (US); Weidong Yang, San Diego, CA (US); Wei Zeng, Saratoga, CA (US); Yuchul Kim, Cupertino, CA (US); Yushu Zhang, Beijing (CN); Zhibin Wu, Los Altos, CA (US); Oghenekome Oteri, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,729

(22) Filed: Sep. 27, 2023

(65) Prior Publication Data

US 2024/0089832 A1 Mar. 14, 2024

Related U.S. Application Data

(63) Continuation of application No. 17/593,124, filed as application No. PCT/CN2020/136518 on Dec. 15, 2020.

(30) Foreign Application Priority Data

Feb. 12, 2020 (WO) ................ PCT/CN2020/074849

(51) Int. Cl.
*H04W 48/10* (2009.01)
*H04L 5/00* (2006.01)

(52) U.S. Cl.
CPC .......... *H04W 48/10* (2013.01); *H04L 5/0053* (2013.01)

(58) Field of Classification Search
CPC .................................................... H04W 48/10
See application file for complete search history.

(56) References Cited

U.S. PATENT DOCUMENTS

2018/0295609 A1   10/2018   Shimezawa et al.
2019/0335508 A1*  10/2019   Agiwal ................ H04W 48/18
(Continued)

FOREIGN PATENT DOCUMENTS

CN    103037434 A    4/2013
CN    107615854 A    1/2018
(Continued)

OTHER PUBLICATIONS

Ericsson, "Further considerations on CGI reading requirements in autonomous gaps for R16", R4-1914641, 3GPP TSG-RAN WG4 #93, Agenda Item 9.15.1.3, Reno, Nevada, USA, Nov. 14-18, 2019, 8 pages.

(Continued)

*Primary Examiner* — Abdeltif Ajid
(74) *Attorney, Agent, or Firm* — Dorsey & Whitney LLP

(57) ABSTRACT

Methods and apparatus are provided for a UE to determine a cell global identity (CGI) of a target cell.

15 Claims, 9 Drawing Sheets

(56) References Cited

U.S. PATENT DOCUMENTS

| | | | |
|---|---|---|---|
| 2021/0282197 A1* | 9/2021 | Tang | H04W 48/16 |
| 2021/0345367 A1* | 11/2021 | Tao | H04W 72/0446 |

FOREIGN PATENT DOCUMENTS

| | | |
|---|---|---|
| CN | 110636630 A | 12/2019 |
| WO | 2012177203 A1 | 12/2012 |
| WO | 2019095338 A1 | 5/2019 |
| WO | 2020019259 A1 | 1/2020 |

OTHER PUBLICATIONS

Ericsson, "NR CGI reading with autonomous gaps", R4-1912060, 3GPP TSG-RAN WG4 Meeting #92bis, Chongqing, China, Agenda Item 8.15.1.3, Oct. 14-18, 2019, 5 pages.

ZTE, "Discussion on CGI reading of NR cell with autonomous gaps", R4-1911562, 3GPP TSG WG4 Meeting #92bis, Agenda Item 8.15.1.3, Chongqing, China, Oct. 14-18, 2019, 4 pages.

ZTE, "Further discussion on NR CGI reading with autonomous gaps", R4-1914786, 3GPP TSG-RAN WG4 Meeting #93, Reno, Nevada, Agenda Item 9.15.1.3, Nov. 18-22, 2019, 7 pages.

U.S. Appl. No. 17/593,124, Final Office Action, Apr. 11, 2024, 24 pages.

Ericsson, "Draft CR to 38.331 on corrections to intra-RAT CGI reporting", R2-1809678, 3GPP TSG-WG2 Meeting #102, Busan, South Korea, Change Request 38.331 CR 100 Rev 1 Current Version 15.2.0, May 21-25, 2018, 192 pages.

U.S. Appl. No. 17/593,124, Notice of Allowance, Jul. 3, 2024, 12 pages.

Intel Corporation, "ad-hoc for R16 NR RRM enhancement", #R4-1915924, 3GPP TSG-RAN WG4 Meeting #93, Reno, Nevada, Agenda Item 9.15, 33 pages.

PCT/CN2020/136518, International Search Report and Written Opinion, Mar. 11, 2021, 9 pages.

Mediatek Inc., "Discussion on CGI reading requirement for NR", #R4-1913313, 3GPP TSG-RAN WG4 Meeting #93, Reno, Nevada, Agenda Item 9.15.1.3, 6 pages.

U.S. Appl. No. 17/593,124, Non-Final Office Action, Oct. 3, 2023, 18 pages.

* cited by examiner

METHOD AND APPARATUS FOR UE ASSUMPTION FOR CGI READING IN NR

TECHNICAL FIELD

This application relates generally to wireless communication systems, and more specifically to determining a cell global identity of a target cell.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In NR, a UE decodes both MIB and SIB1 to read the CGI (Cell Global Identity). The CGI information is carried in IE "CellIdentity" in IE "PLMN-IdentityInfo" in IE "PLMN-IdentityInfoList" in IE "CellAccessRelatedInfo" in SIB1, which can be found in 3GPP TS 38.331 (shown below)

```
PLMN-IdentityInfo ::=    SEQUENCE {
    plmn-IdentityList        SEQUENCE (SIZE (1..maxPLMN)) OF PLMN-Identity,
    trackingAreaCode         TrackingAreaCode                 OPTIONAL,   -- Need R
    ranac                    RAN-AreaCode                     OPTIONAL,   -- Need R
    cellIdentity             CellIdentity,
    cellReservedForOperatorUse ENUMERATED {reserved, notReserved},
    ...
}
-- TAG-PLMN-IDENTITYINFOLIST-STOP
-- ASN1STOP
```

In order to read MIB and SIB1, the UE needs to understand the periodicity and time offset of those MIB and SIB1 of the target cell. MIB is carried on PBCH of SSB. In certain systems, for example, the MIB is always transmitted on the PBCH with a periodicity of 80 ms and repetitions made within 80 ms (repetition is same as SSB). The MIB includes parameters that are needed to acquire SIB1 from the cell.

However, the current SIB1 reading may have some limitations depending on different conditions. For example, the SIB1 is transmitted on the DL-SCH with a periodicity of 160 ms and variable transmission repetition periodicity within 160 ms, as configured in signaling pdcch-ConfigSIB1 in MIB. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3 (pattern 2 or pattern 3), SIB1 transmission repetition period is the same as the SSB period.

Figure 1:
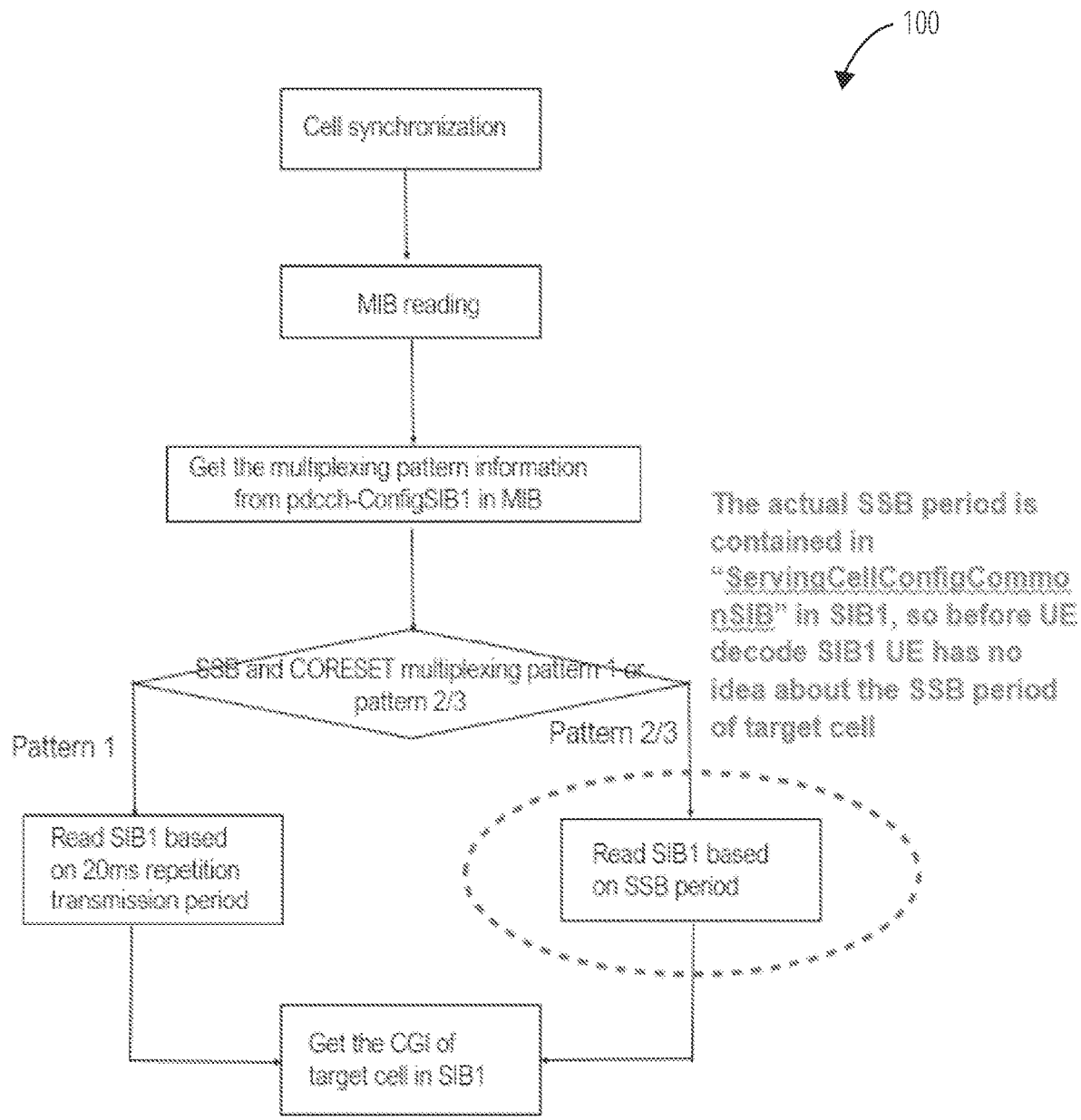
FIG. 1 illustrates a method in accordance with one embodiment.

FIG. 1 is a flow diagram of an example method 100 for determining the CGI of a target cell in SIB1. As shown in FIG. 1, if SSB and CORESET multiplexing pattern is pattern 2/3 (2 or 3), SIB1 transmission repetition period is the same as the SSB period. However, the SSB period information is carried in SIB1 as well for target cell.

IE "ServingCellConfigCommonSIB" in SIB1 includes a parameter named "ssb-PeriodicityServingCell", and "ssb-PeriodicityServingCell" indicates the SSB period/periodicity for this cell.

If the UE uses the SSB period to decode SIB1, the UE has to know the SSB period of this target cell first and that means UE has to decode this SIB1 of target cell before. Then CGI reading assumption is a deadlock to UE implementation.

Thus, it would be useful for UE behavior and assumption to be carefully designed to avoid the ambiguity.

Target Cell CGI Reading with SMT Configuration

Figure 2:
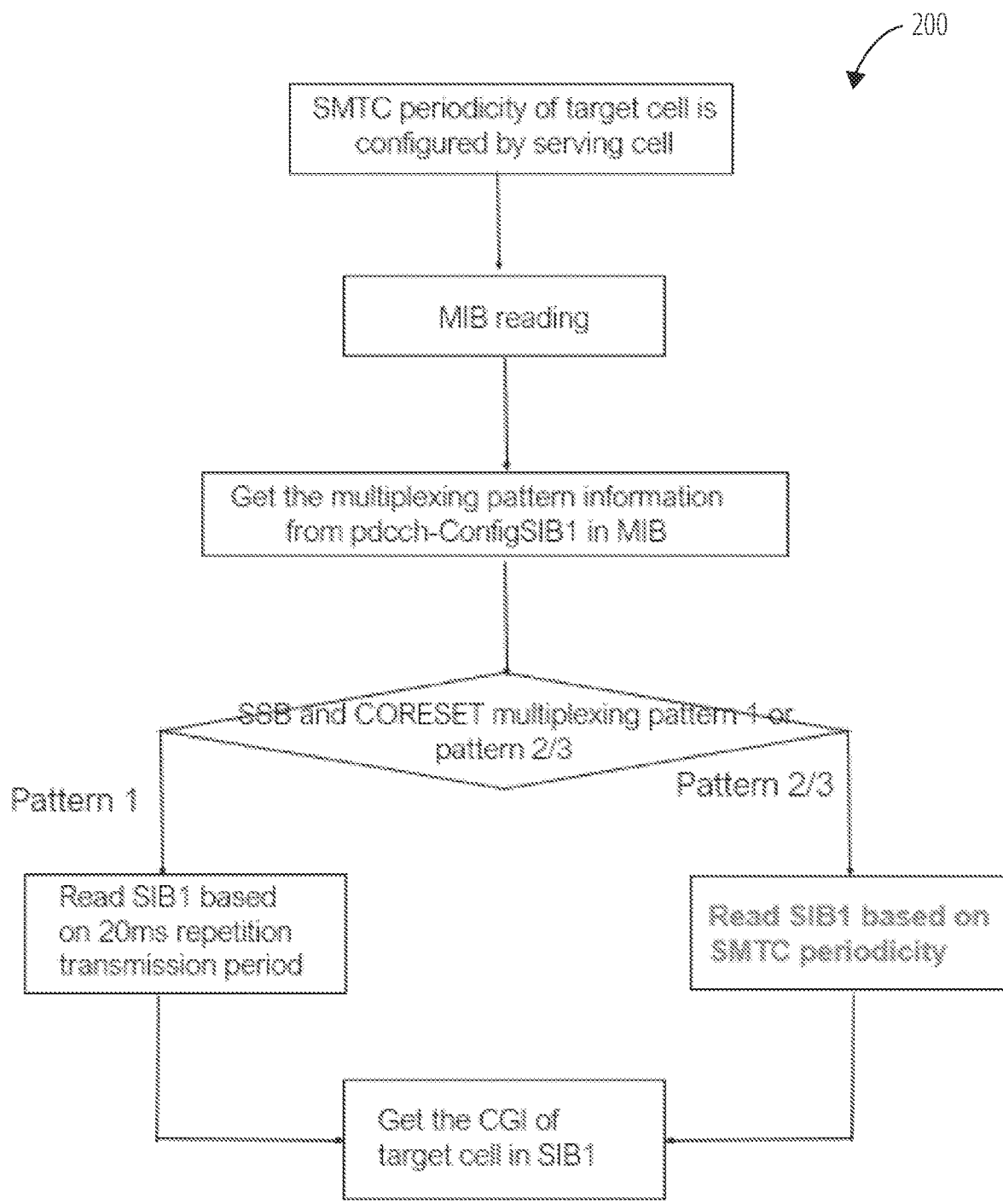
FIG. 2 illustrates a method in accordance with one embodiment.

FIG. 2 is a flow diagram of a method 200 for target cell CGI reading with SMTC configuration according to one embodiment. Before the CGI reading for target cell, if the serving cell configure SMTC to the UE for this target cell detection/measurement, for SSB and CORESET multiplexing pattern 1, SIB1 repetition transmission period keeps 20 ms. However, for the SSB and CORESET multiplexing pattern 2/3, SIB1 transmission repetition period may be assumed as same as the SMTC periodicity for UE implementation.

The UE may keep decode of SIB1 for target cell only within the SMTC duration window.

The UE interrupts the connection with its serving cell per SMTC periodicity. The interruption would be on serving cell DL channels to the UE and UL channel from the UE to the serving cell.

Figure 3:
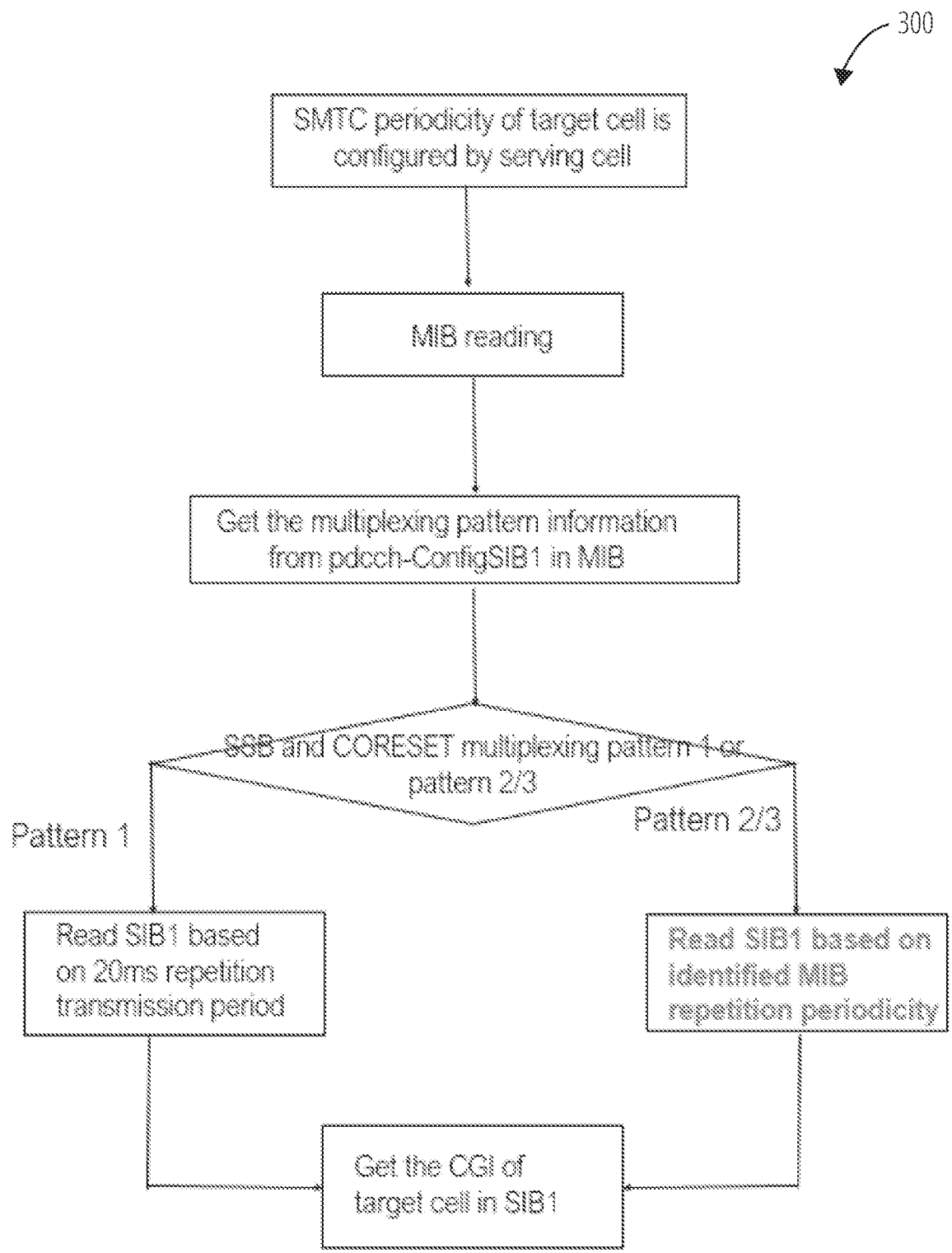
FIG. 3 illustrates a method in accordance with one embodiment.

FIG. 3 is a flow diagram of a method 300 for target cell CGI reading with SMTC configuration according to another embodiment. Before the CGI reading for target cell, if the serving cell configures SMTC to the UE for this target cell detection/measurement, for SSB and CORESET multiplexing pattern 1, SIB1 repetition transmission period keeps 20 ms. However, for the SSB and CORESET multiplexing pattern 2/3, SIB1 transmission repetition period may be assumed as same as the MIB repetition periodicity which was identified by the UE.

The UE may use SMTC to do PBCH decoding to read MIB. However, if the UE identified more SSB occasion outside the SMTC window, the UE can also use those SSB occasion to read MIB.

The UE uses the identified MIB repetition periodicity to assume SIB1 repetition periodicity.

Target Cell CGI Reading without SMTC Configuration

Figure 4:
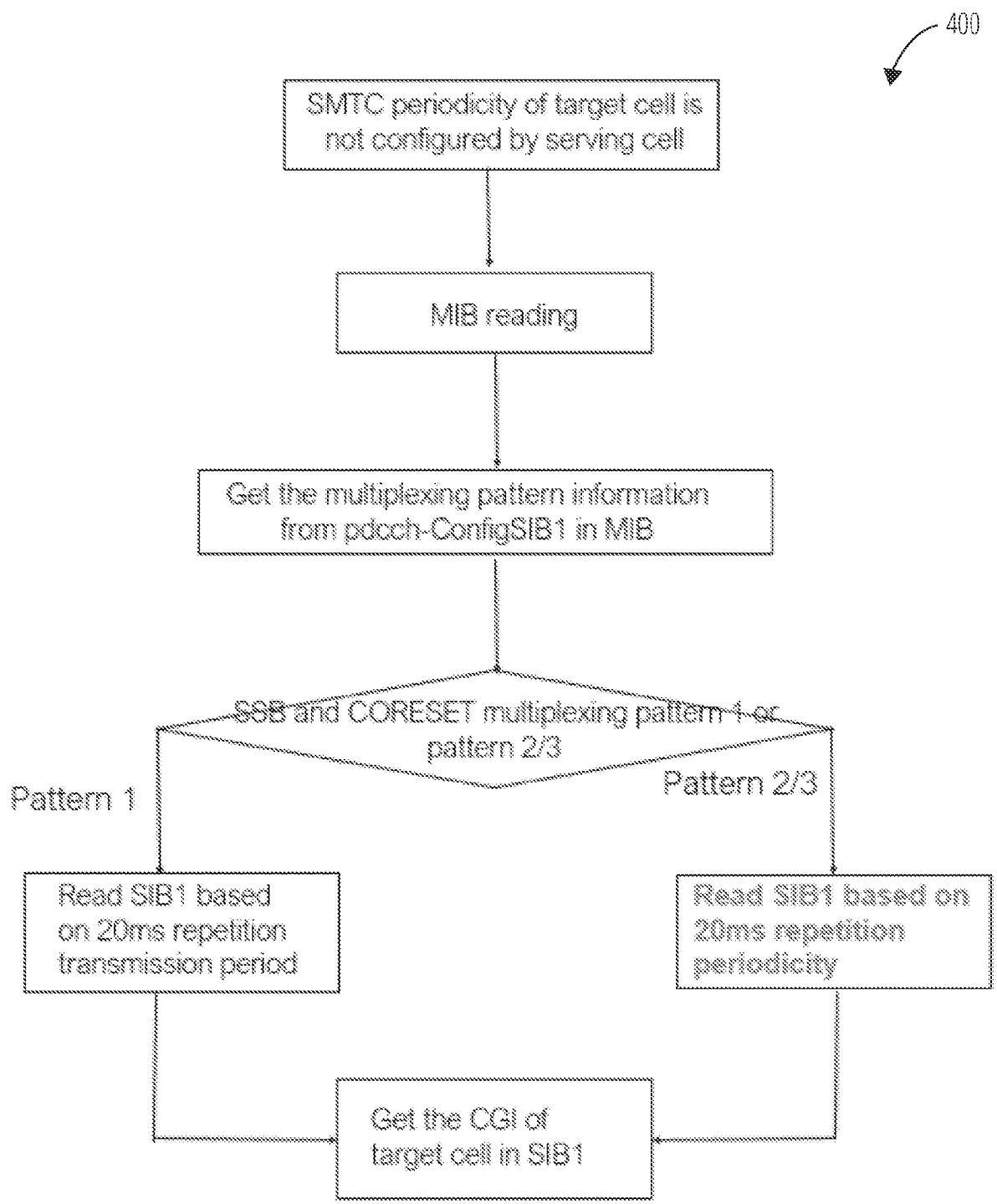
FIG. 4 illustrates a method in accordance with one embodiment.

FIG. 4 is a flow diagram of a method 400 for target cell CGI reading without SMTC configuration according to one embodiment. Before the CGI reading for target cell, if the serving cell didn't configure SMTC to the UE for this target cell detection/measurement, for SSB and CORESET multiplexing pattern 1, SIB1 repetition transmission period may keep 20 ms. For the SSB and CORESET multiplexing pattern 2/3, SIB1 transmission repetition period may be assumed as 20 ms as well.

The UE uses 20 ms repetition periodicity as same as for initial access case to read SIB1 for target cell.

The UE may use 5 ms or 20 ms as repetition periodicity to read MIB.

Figure 5:
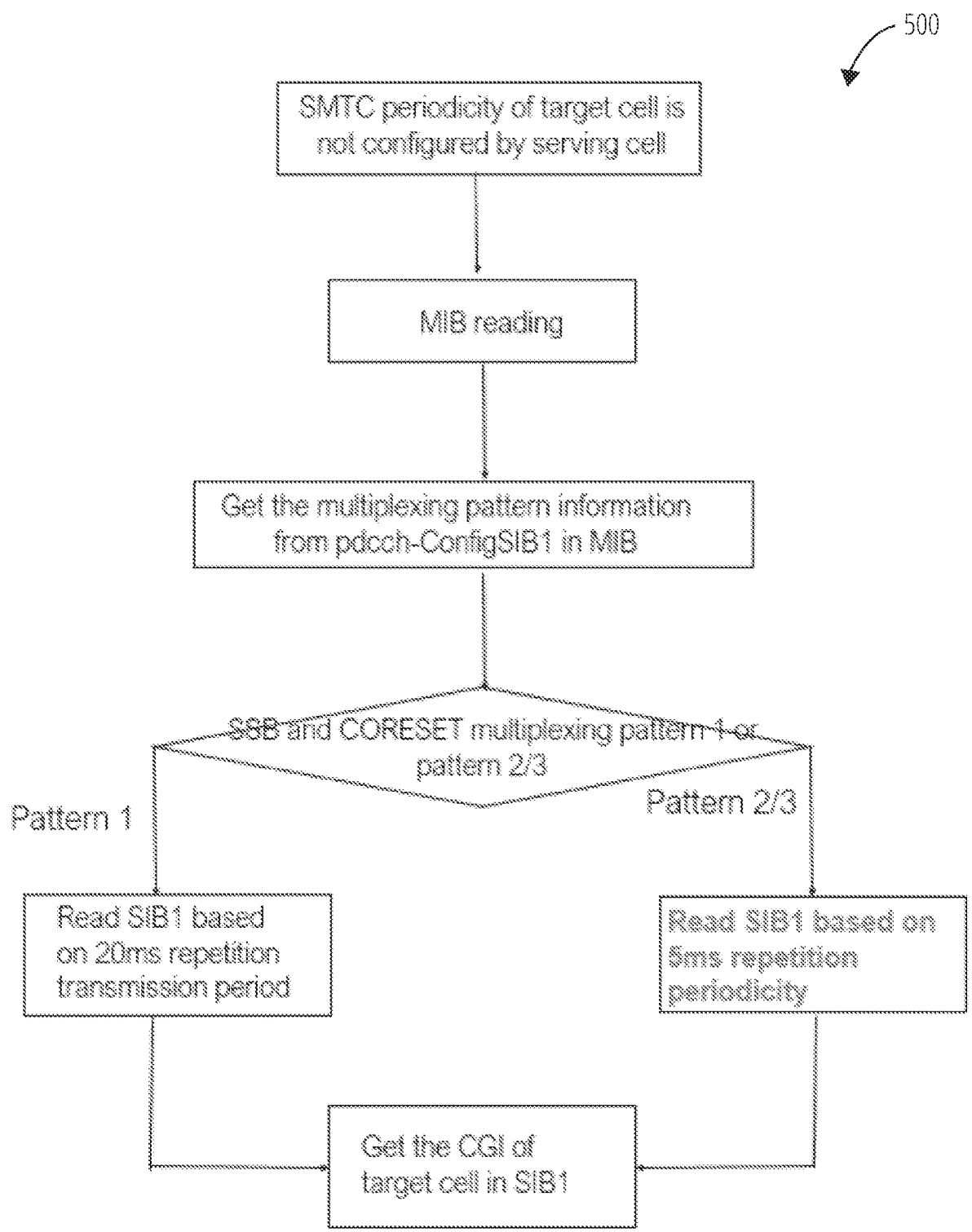
FIG. 5 illustrates a method in accordance with one embodiment.

FIG. 5 is a flow diagram of a method 500 for target cell CGI reading without SMTC configuration according to another embodiment. Before the CGI reading for target cell, if the serving cell didn't configure SMTC to the UE for this target cell detection/measurement, for SSB and CORESET multiplexing pattern 1, SIB1 repetition transmission period keeps 20 ms, For the SSB and CORESET multiplexing pattern 2/3, SIB1 transmission repetition period may be assumed as 5 ms.

The UE uses 5 ms as a default periodicity to do target cell measurement and detection.

The UE uses 5 ms as same as cell detection/measurement for target cell SIB1 reading.

The UE may use 5 ms or 20 ms as repetition periodicity to read MIB.

Figure 6:
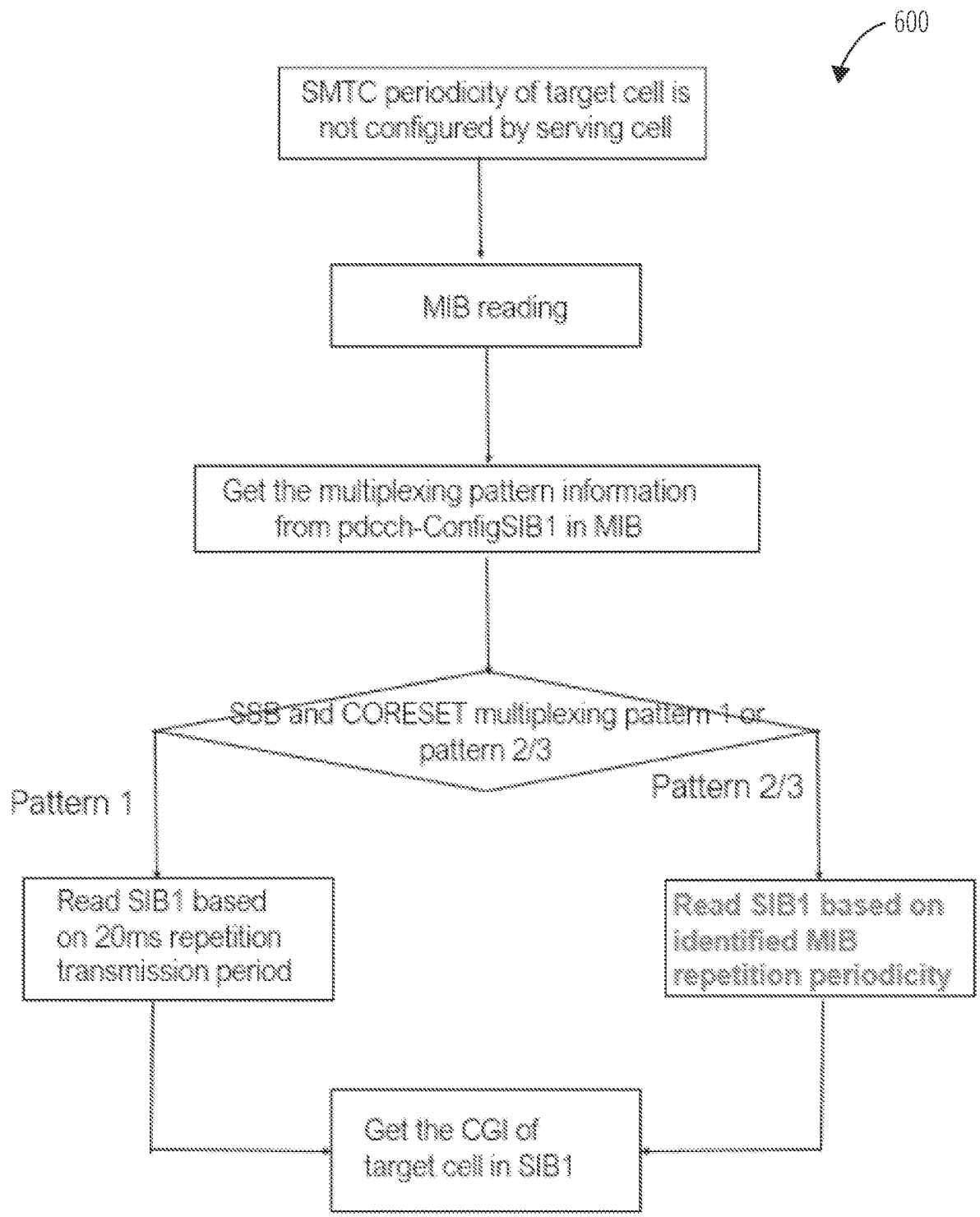
FIG. 6 illustrates a method in accordance with one embodiment.

FIG. 6 is a flow diagram of a method 600 for target cell CGI reading without SMTC configuration according to yet another embodiment. Before the CGI reading for target cell, if the serving cell didn't configure SMTC to the UE for this target cell detection/measurement, for SSB and CORESET multiplexing pattern 1, SIB1 repetition transmission period keeps 20 ms. For the SSB and CORESET multiplexing pattern 2/3, SIB1 transmission repetition period may be assumed as same as MIB repetition periodicity which was identified by UE.

The UE uses 5 ms as a default periodicity to do target cell measurement and detection.

The UE may use 5 ms or 20 ms as repetition periodicity to read MIB.

The UE assumes the SIB1 repetition periodicity as same as MIB repetition periodicity.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 7:
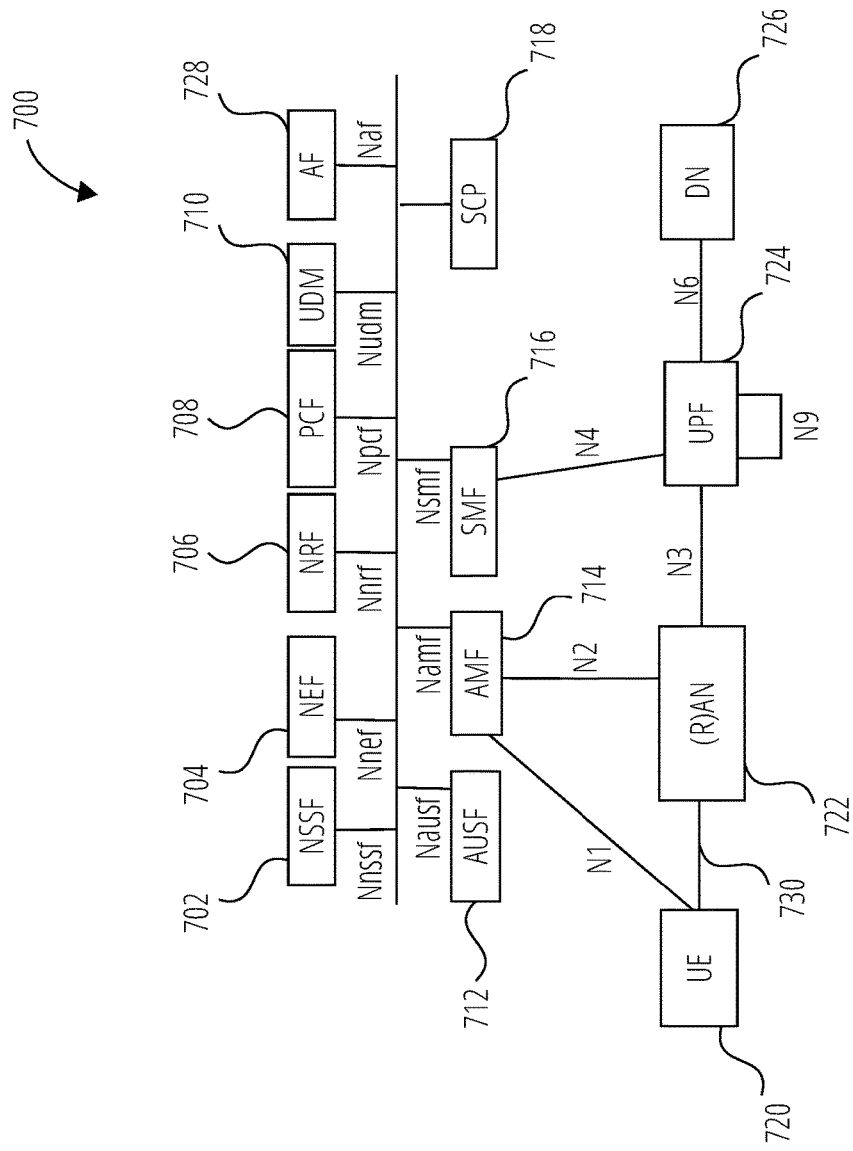
FIG. 7 illustrates an example service based architecture in accordance with certain embodiments.

FIG. 7 illustrates a service based architecture 700 in 5GS according to one embodiment. As described in 3GPP TS 23.501, the service based architecture 700 comprises NFs such as an NSSF 702, a NEF 704, an NRF 706, a PCF 708, a UDM 710, an AUSF 712, an AMF 714, an SMF 716, for communication with a UE 720, a (R)AN 722, a UPF 724, and a DN 726. The NFs and NF services can communicate directly, referred to as Direct Communication, or indirectly via a SCP 718, referred to as Indirect Communication. FIG. 7 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 7 are described below.

The NSSF 702 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 704 supports exposure of capabilities and events. NF capabilities and events may be securely exposed by the NEF 704 (e.g., for 3rd party, Application Functions, and/or Edge Computing). The NEF 704 may store/retrieve information as structured data using a standardized interface (Nudr) to a UDR. The NEF 704 may also secure provision of information from an external application to 3GPP network and may provide for the Application Functions to securely provide information to the 3GPP network (e.g., expected UE behavior, 5GLAN group information, and service specific information), wherein the NEF 704 may authenticate and authorize and assist in throttling the Application Functions. The NEF 704 may provide translation of internal-external information by translating between information exchanged with the AF and information exchanged with the internal network function. For example, the NEF 704 translates between an AF-Service-Identifier and internal 5G Core information such as DNN and S-NSSAI. The NEF 704 may handle masking of network and user sensitive information to external AF's according to the network policy. The NEF 704 may receive information from other network functions (based on exposed capabilities of other network functions), and stores the received information as structured data using a standardized interface to a UDR. The stored information can be accessed and re-exposed by the NEF 704 to other network functions and Application Functions, and used for other purposes such as analytics. For external exposure of services related to specific UE(s), the NEF 704 may reside in the HPLMN. Depending on operator agreements, the NEF 704 in the HPLMN may have interface(s) with NF(s) in the VPLMN. When a UE is capable of switching between EPC and 5GC, an SCEF+NEF may be used for service exposure.

The NRF 706 supports service discovery function by receiving an NF Discovery Request from an NF instance or SCP and providing the information of the discovered NF instances to the NF instance or SCP. The NRF 706 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 708 supports a unified policy framework to govern network behavior. The PCF 708 provides policy rules to Control Plane function(s) to enforce them. The PCF 708 accesses subscription information relevant for policy decisions in a Unified Data Repository (UDR). The PCF 708 may access the UDR located in the same PLMN as the PCF.

The UDM 710 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 710 uses subscription data (including authentication data) that may be stored in a UDR, in which case a UDM implements the application logic and may not require an internal user data storage and several different UDMs may serve the same user in different transactions. The UDM 710 may be located in the HPLMN of the subscribers it serves, and may access the information of the UDR located in the same PLMN.

The AF 728 interacts with the Core Network to provide services that, for example, support the following: application influence on traffic routing; accessing the NEF 704; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to access directly the Network Functions may use the external exposure framework via the NEF 704 to interact with relevant Network Functions.

The AUSF 712 supports authentication for 3GPP access and untrusted non-3GPP access. The AUSF 712 may also provide support for Network Slice-Specific Authentication and Authorization.

The AMF 714 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 714. Regardless of the number of Network functions, in certain embodiments there is only one NAS interface instance per access network between the UE and the CN, terminated at one of the Network functions that implements at least NAS security and Mobility Management. The AMF 714 may also include policy related functionalities.

In addition to the functionalities described above, the AMF 714 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 716 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 716 may include policy related functionalities.

The SCP 718 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 718 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 720 may include a device with radio communication capabilities. For example, the UE 720 may comprise a smartphone (e.g., handheld touchscreen mobile computing devices connectable to one or more cellular networks). The UE 720 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 720 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 720 may be configured to connect or communicatively couple with the (R)AN 722 through a radio interface 730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 720 and the (R)AN 722 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 722 to the UE 720 and a UL transmission may be from the UE 720 to the (R)AN 722. The UE 720 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 722 can include one or more access nodes, which may be referred to as base stations (BS s), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 722 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 722) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 720 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 724 may act as an anchor point for intra-RAT and inter-RAT mobility, an external PDU session point of interconnect to the DN 726, and a branching point to support multi-homed PDU session. The UPF 724 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 724 may include an uplink classifier to support routing traffic flows to a data network. The DN 726 may represent various network operator services, Internet access, or third party services. The DN 726 may include, for example, an application server.

Figure 8:
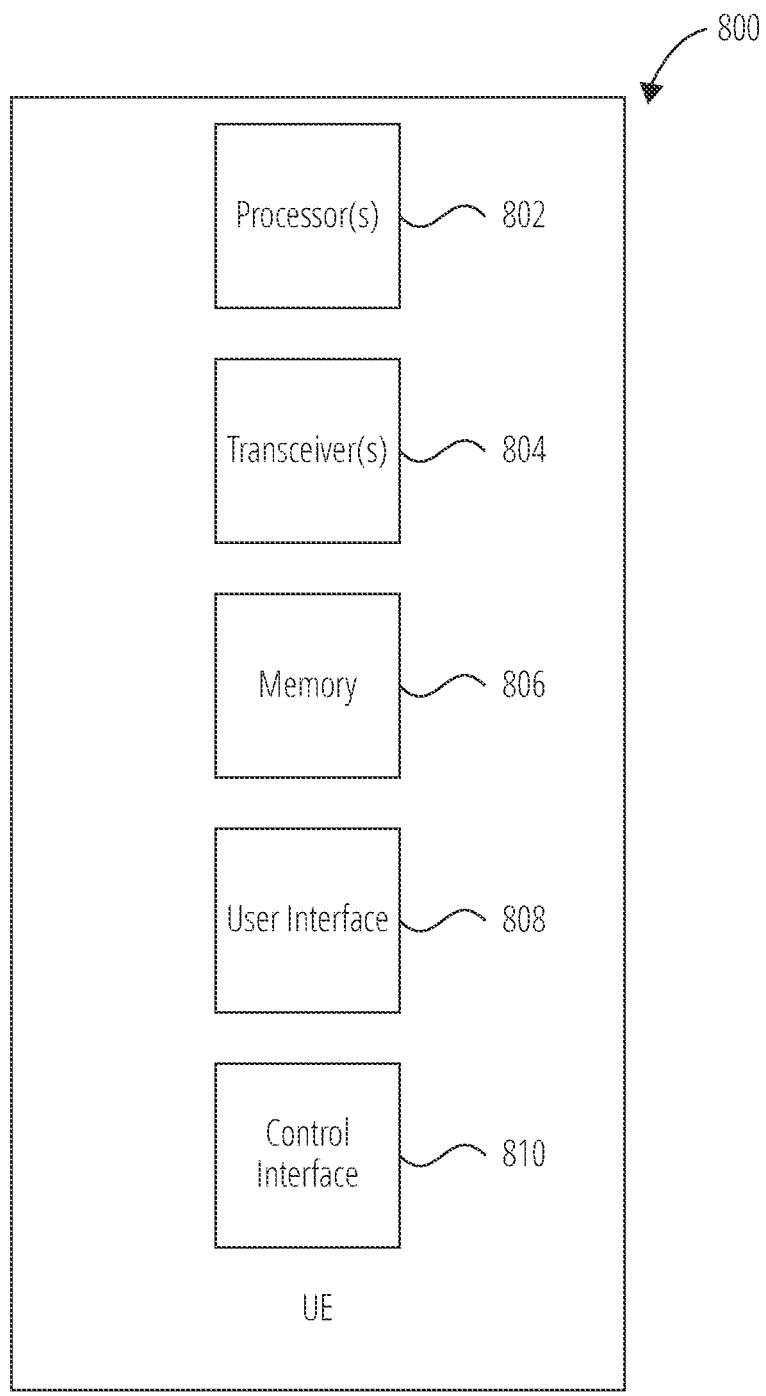
FIG. 8 illustrates a UE in accordance with one embodiment.

FIG. 8 is a block diagram of an example UE 800 configurable according to various embodiments of the present disclosure, including by execution of instructions on a computer-readable medium that correspond to any of the example methods and/or procedures described herein. The UE 800 comprises one or more processor 802, transceiver 804, memory 806, user interface 808, and control interface 810.

The one or more processor 802 may include, for example, an application processor, an audio digital signal processor, a central processing unit, and/or one or more baseband processors. Each of the one or more processor 802 may include internal memory and/or may include interface(s) to communication with external memory (including the memory 806). The internal or external memory can store software code, programs, and/or instructions for execution by the one or more processor 802 to configure and/or facilitate the UE 800 to perform various operations, including operations described herein. For example, execution of the instructions can configure the UE 800 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 804, user interface 808, and/or control interface 810. As another example, the one or more processor 802 may execute program code stored in the memory 806 or other memory that corresponds to MAC, RLC, PDCP, and RRC layer protocols standardized by 3GPP (e.g., for NR and/or LTE). As a further example, the processor 802 may execute program code stored in the memory 806 or other memory that, together with the one or more transceiver 804, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 806 may comprise memory area for the one or more processor 802 to store variables used in protocols, configuration, control, and other functions of the UE 800, including operations corresponding to, or comprising, any of the example methods and/or procedures described herein. Moreover, the memory 806 may comprise non-volatile memory (e.g., flash memory), volatile memory (e.g., static or dynamic RAM), or a combination thereof. Furthermore, the memory 806 may interface with a memory slot by which removable memory cards in one or more formats (e.g., SD Card, Memory Stick, Compact Flash, etc.) can be inserted and removed.

The one or more transceiver 804 may include radio-frequency transmitter and/or receiver circuitry that facilitates the UE 800 to communicate with other equipment supporting like wireless communication standards and/or protocols. For example, the one or more transceiver 804 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 802. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 804 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 802 to implement a PHY layer based on OFDM, OFDMA, and/or SC-FDMA technologies, such as described herein with respect to other figures.

The user interface 808 may take various forms depending on particular embodiments, or can be absent from the UE 800. In some embodiments, the user interface 808 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 800 may comprise a tablet computing device including a larger touchscreen display. In such embodiments, one or more of the mechanical features of the user interface 808 may be replaced by comparable or functionally equivalent virtual user interface features (e.g., virtual keypad, virtual buttons, etc.) implemented using the touchscreen display, as familiar to persons of ordinary skill in the art. In other embodiments, the UE 800 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 800 having a touch screen display are capable of receiving user inputs, such as inputs related to exemplary methods and/or procedures described herein or otherwise known to persons of ordinary skill in the art.

In some exemplary embodiments of the present disclosure, the UE 800 may include an orientation sensor, which can be used in various ways by features and functions of the UE 800. For example, the UE 800 can use outputs of the orientation sensor to determine when a user has changed the physical orientation of the UE 800's touch screen display. An indication signal from the orientation sensor can be available to any application program executing on the UE 800, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 810 may take various forms depending on particular embodiments. For example, the control interface 810 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 810 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 800 may include more functionality than is shown in FIG. 8 including, for example, a video and/or still-image camera, microphone, media player and/or recorder, etc. Moreover, the one or more transceiver 804 may include circuitry for communication using additional radio-frequency communication standards including Bluetooth, GPS, and/or others. Moreover, the one or more processor 802 may execute software code stored in the memory 806 to control such additional functionality. For example, directional velocity and/or position estimates output from a GPS receiver can be available to any application program executing on the UE 800, including various exemplary methods and/or computer-readable media according to various exemplary embodiments of the present disclosure.

Figure 9:
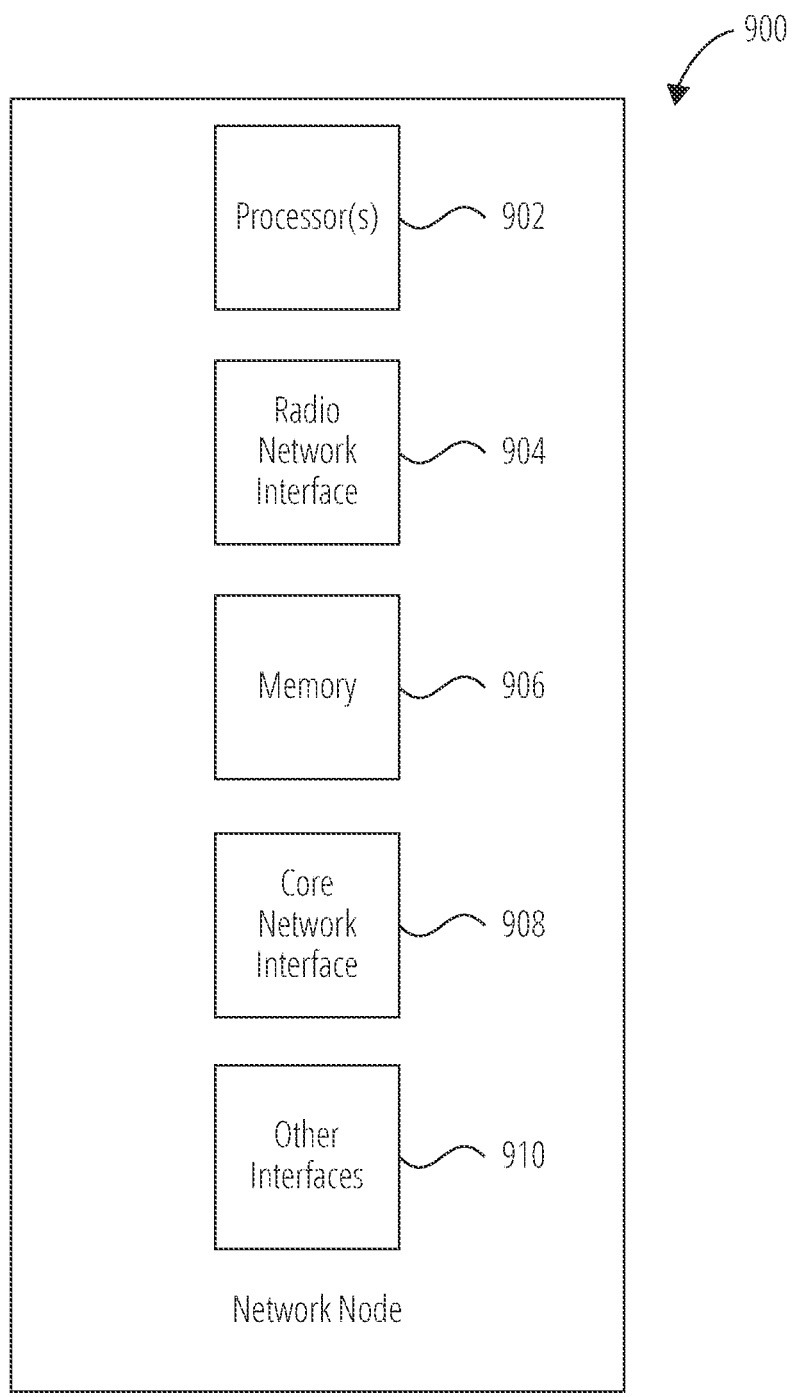
FIG. 9 illustrates a network node in accordance with one embodiment.

FIG. 9 is a block diagram of an example network node 900 configurable according to various embodiments of the present disclosure, including by execution of instructions on a computer-readable medium that correspond to any of the example methods and/or procedures described herein.

The network node 900 includes a one or more processor 902, a radio network interface 904, a memory 906, a core network interface 908, and other interfaces 910. The network node 900 may comprise, for example, a base station, eNB, gNB, access node, or component thereof.

The one or more processor 902 may include any type of processor or processing circuitry and may be configured to perform an of the methods or procedures disclosed herein. The memory 906 may store software code, programs, and/or instructions executed by the one or more processor 902 to configure the network node 900 to perform various operations, including operations described herein. For example, execution of such stored instructions can configure the network node 900 to communicate with one or more other devices using protocols according to various embodiments of the present disclosure, including one or more methods and/or procedures discussed above. Furthermore, execution of such stored instructions can also configure and/or facilitate the network node 900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 904 and the core network interface 908. By way of example and without limitation, the core network interface 908 comprise an Si interface and the radio network interface 904 may comprise a Uu interface, as standardized by 3GPP. The memory 906 may also store variables used in protocols, configuration, control, and other functions of the network node 900. As such, the memory 906 may comprise non-volatile memory (e.g., flash memory, hard disk, etc.), volatile memory (e.g., static or dynamic RAM), network-based (e.g., "cloud") storage, or a combination thereof.

The radio network interface 904 may include transmitters, receivers, signal processors, ASICs, antennas, beamforming units, and other circuitry that enables network node 900 to communicate with other equipment such as, in some embodiments, a plurality of compatible user equipment (UE). In some embodiments, the network node 900 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 904 may include a PHY layer based on OFDM, OFDMA, and/or SC-FDMA technologies. In some embodiments, the functionality of such a PHY layer can be provided cooperatively by the radio network interface 904 and the one or more processor 902.

The core network interface 908 may include transmitters, receivers, and other circuitry that enables the network node 900 to communicate with other equipment in a core network such as, in some embodiments, circuit-switched (CS) and/or packet-switched Core (PS) networks. In some embodiments, the core network interface 908 may include the Si interface standardized by 3GPP. In some embodiments, the core network interface 908 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 908 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 910 may include transmitters, receivers, and other circuitry that enables the network node 900 to communicate with external networks, computers, databases, and the like for purposes of operations, administration, and maintenance of the network node 900 or other network equipment operably connected thereto.

EXAMPLES

For one or more embodiments, at least one of the components set forth in one or more of the preceding figures may be configured to perform one or more operations, techniques, processes, and/or methods as set forth in the examples below. For example, baseband circuitry or other processors or processing circuitry as described herein may be configured to operate in accordance with one or more of the examples set forth below. For another example, circuitry associated with a UE, base station, network element, etc. as described above in connection with one or more of the preceding figures may be configured to operate in accordance with one or more of the examples set forth in the examples below.

Example 1 may include an apparatus comprising means to perform one or more elements of a method described herein.

Example 2 may include one or more non-transitory computer-readable media comprising instructions to cause an electronic device, upon execution of the instructions by one or more processors of the electronic device, to perform one or more elements of a method or process described herein.

Example 3 may include an apparatus comprising logic, modules, or circuitry to perform one or more elements of a method or process described herein.

Example 4 may include a method, technique, or process as described in or related to any of examples 1-3, or portions or parts thereof.

Example 5 may include an apparatus comprising: one or more processors and one or more computer-readable media comprising instructions that, when executed by the one or more processors, cause the one or more processors to perform the method, techniques, or process as described in or related to any embodiments herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE) to identify a cell global identity (CGI) of a target cell, comprising:
   determining that synchronization signal block (SSB) Measurement Timing Configuration (SMTC) periodicity of the target cell has not been configured by a serving cell;
   decoding a master information block (MIB), wherein the MIB includes multiplexing pattern information;
   based on decoding the MIB, identifying whether the SSB and control resource set (CORESET) multiplexing pattern is pattern 1, pattern 2 or pattern 3;
   based on identifying that the SSB and CORESET multiplexing pattern is pattern 2 or pattern 3, reading a system information block type 1 (SIB1) using a 5 millisecond repetition transmission period; and
   obtaining the CGI of the target cell in the SIB1.

2. The method of claim 1, wherein the multiplexing pattern information is included in a pdcch-ConfigSIB1 parameter of the MIB.

3. The method of claim 1, wherein decoding the MIB is performed using a 5 millisecond periodicity.

4. The method of claim 1, wherein decoding the MIB is performed using a 20 millisecond periodicity.

5. The method of claim 1, further comprising, based on identifying that the SSB and CORESET multiplexing pattern is pattern 1, reading the SIB1 based on a 20 millisecond repetition transmission period.

6. A method for a user equipment (UE) to identify a cell global identity (CGI) of a target cell, comprising:

determining that synchronization signal block (SSB) Measurement Timing Configuration (SMTC) periodicity of the target cell has not been configured by a serving cell;

decoding a master information block (MIB) using an MIB repetition transmission period, wherein the MIB includes multiplexing pattern information;

based on decoding the MIB, identifying whether the SSB and control resource set (CORESET) multiplexing pattern is pattern 1, pattern 2 or pattern 3;

based on identifying that the SSB and CORESET multiplexing pattern is pattern 2 or pattern 3, reading a system information block type 1 (SIB1) using the MIB repetition transmission period; and obtaining the CGI of the target cell in the SIB1.

7. The method of claim 6, wherein the multiplexing pattern information is included in a pdcch-ConfigSIB1 parameter of the MIB.

8. The method of claim 6, wherein decoding the MIB is performed using a 5 millisecond periodicity.

9. The method of claim 6, wherein decoding the MIB is performed using a 20 millisecond periodicity.

10. The method of claim 6, further comprising, based on identifying that the SSB and CORESET multiplexing pattern is pattern 1, reading the SIB1 based on a 20 millisecond repetition transmission period.

11. An apparatus for a user equipment (UE) to identify a cell global identity (CGI) of a target cell, the apparatus comprising:

one or more processors, and a memory storing instructions that, when executed by the one or more processors, configure the UE to:

determine that synchronization signal block (SSB) Measurement Timing Configuration (SMTC) periodicity of the target cell has not been configured by a serving cell;

decode a master information block (MIB), wherein the MIB includes multiplexing pattern information;

based on decoding the MIB, identify whether the SSB and control resource set (CORESET) multiplexing pattern is pattern 1, pattern 2 or pattern 3;

based on identifying that the SSB and CORESET multiplexing pattern is pattern 2 or pattern 3, read a system information block type 1 (SIB1) using a 5 millisecond repetition transmission period; and obtain the CGI of the target cell in the SIB1.

12. The apparatus of claim 11, wherein the multiplexing pattern information is included in a pdcch-ConfigSIB1 parameter of the MIB.

13. The apparatus of claim 11, wherein decoding the MIB is performed using a 5 millisecond periodicity.

14. The apparatus of claim 11, wherein decoding the MIB is performed using a 20 millisecond periodicity.

15. The apparatus of claim 11, wherein the instructions, when executed by the one or more processors, further configure the UE to, based on identifying that the SSB and CORESET multiplexing pattern is pattern 1, read the SIB1 based on a 20 millisecond repetition transmission period.

* * * * *